US011317256B2

(12) United States Patent
Baek et al.

(10) Patent No.: US 11,317,256 B2
(45) Date of Patent: *Apr. 26, 2022

(54) METHOD OF DISPLAYING AN EVENT IN A MOBILE TERMINAL AND MOBILE TERMINAL IMPLEMENTING THE SAME

(71) Applicant: Samsung Electronics Co., Ltd., Suwon-si (KR)

(72) Inventors: Su-A Baek, Gumi-si (KR); Kyung-Ae Lim, Seoul (KR); Seung-Chul Choi, Seseong-gu (KR); Jae-Won Chang, Chilgok-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,782

(22) Filed: May 18, 2020

(65) Prior Publication Data

US 2020/0280823 A1 Sep. 3, 2020

Related U.S. Application Data

(63) Continuation of application No. 15/613,784, filed on Jun. 5, 2017, now Pat. No. 10,681,508, which is a (Continued)

(30) Foreign Application Priority Data

Apr. 1, 2005 (KR) ........................ 10-2005-0027726
Mar. 6, 2006 (KR) ........................ 10-2006-0020898

(51) Int. Cl.
*H04W 4/12* (2009.01)
*H04M 1/72403* (2021.01)
(Continued)

(52) U.S. Cl.
CPC ......... *H04W 4/12* (2013.01); *H04M 1/72403* (2021.01); *H04M 1/72448* (2021.01);
(Continued)

(58) Field of Classification Search
CPC .. G06F 3/04817; G06F 1/3203; G06F 1/3209; G06F 2203/04803; H04W 4/12;
(Continued)

(56) References Cited

U.S. PATENT DOCUMENTS 4,775,953 A   10/1988   Goettelmann et al.
6,459,359 B1  10/2002   Miyashita
(Continued)

FOREIGN PATENT DOCUMENTS

CN   1141002 C      1/1997
EP   0 733 983 A2   9/1996
(Continued)

OTHER PUBLICATIONS

User Guide of Motorola A780 GSM (GPRS) Digital Mobile Phone, Sep. 17, 2004, Edition 1.OF Version.
(Continued)

*Primary Examiner* — Sherrod L Keaton
(74) *Attorney, Agent, or Firm* — Jefferson IP Law, LLP

(57) ABSTRACT

A method of, and a mobile terminal configured for, efficiently displaying an event indication in the form of a pop-up box during idle mode of a mobile terminal is provided. Upon occurrence of a second event in idle mode, it is determined whether an event pop-up box indicating an occurrence of a first event of the same type as the second event exists. When the event pop-up box indicating the occurrence of the first event exists, the event pop-up box is updated with information indicating the occurrence of the second event and displayed on a display.

12 Claims, 5 Drawing Sheets

Related U.S. Application Data continuation of application No. 13/943,278, filed on Jul. 16, 2013, now abandoned, which is a continuation of application No. 11/387,866, filed on Mar. 24, 2006, now abandoned.

(51) Int. Cl.
*H04M 1/72448* (2021.01)
*H04M 1/72484* (2021.01)
*H04M 1/57* (2006.01)
*G06F 3/04817* (2022.01)
*H04M 1/7243* (2021.01)

(52) U.S. Cl.
CPC ..... *H04M 1/72484* (2021.01); *G06F 3/04817* (2013.01); *H04M 1/575* (2013.01); *H04M 1/7243* (2021.01); *H04M 2250/60* (2013.01)

(58) Field of Classification Search
CPC .... G06Q 30/02; H04M 1/57; H04M 1/72544; H04M 1/72552; H04M 1/72566; H04M 1/72448; H04M 1/72403; H04M 1/7243; H04M 1/575; H04M 2250/60
USPC .................................................. 715/808–809
See application file for complete search history.

(56) References Cited

U.S. PATENT DOCUMENTS

| | | | |
|---|---|---|---|
| 6,459,440 B1 | 10/2002 | Monnes et al. | |
| 6,778,069 B1 | 8/2004 | Katagiri | |
| 7,283,813 B2 | 10/2007 | Hamanaga et al. | |
| 2002/0039914 A1* | 4/2002 | Hama | H04M 1/0245 455/566 |
| 2002/0065108 A1 | 5/2002 | Tsukamoto | |
| 2003/0098887 A1 | 5/2003 | Li | |
| 2004/0075701 A1* | 4/2004 | Ng | H04M 1/72552 715/867 |
| 2004/0137884 A1 | 7/2004 | Engstrom et al. | |
| 2004/0155908 A1 | 8/2004 | Wagner | |
| 2004/0171394 A1 | 9/2004 | Daita | |
| 2004/0198457 A1 | 10/2004 | Hayashida et al. | |
| 2004/0261031 A1 | 12/2004 | Tuomainen et al. | |
| 2005/0020316 A1* | 1/2005 | Mahini | H04M 1/72469 455/566 |
| 2005/0049006 A1 | 3/2005 | Lee | |
| 2005/0120306 A1* | 6/2005 | Klassen | G06F 3/04817 715/765 |
| 2005/0130631 A1 | 6/2005 | Maguire et al. | |
| 2005/0141686 A1* | 6/2005 | Matsunaga | H04M 1/57 379/142.01 |
| 2006/0020904 A1* | 1/2006 | Aaltonen | G06F 3/048 715/850 |
| 2006/0084450 A1* | 4/2006 | Dam Nielsen | H04M 1/72544 455/466 |
| 2006/0101350 A1 | 5/2006 | Scott | |
| 2006/0224985 A1 | 10/2006 | Baek et al. | |

FOREIGN PATENT DOCUMENTS

| | | |
|---|---|---|
| EP | 1265157 A2 | 12/2002 |
| IE | 20020613 A1 | 1/2004 |
| KR | 10-2004-0081644 A | 9/2004 |
| WO | 03/056789 A1 | 7/2003 |
| WO | 2005/025191 A1 | 3/2005 |
| WO | 2005/027485 A1 | 3/2005 |

OTHER PUBLICATIONS

Sprint Palm Treo Manual 650; Jul. 29, 2003; pp. 1-388.
European Search Report dated Jul. 18, 2018, issued in European Search Application No. 18170275.4-1216.

* cited by examiner

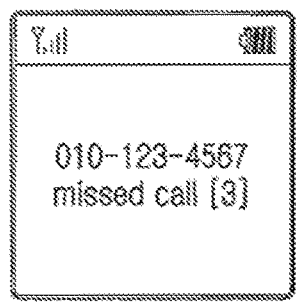 
FIG.1A  FIG.1B
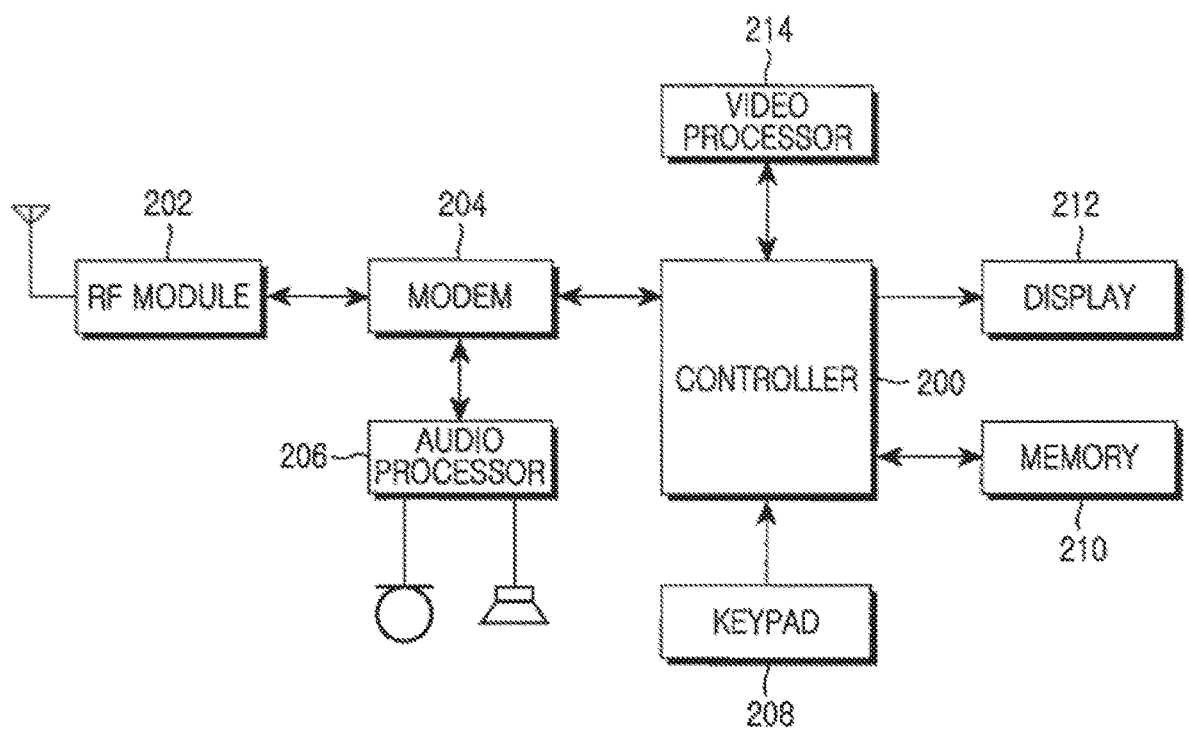
FIG.2

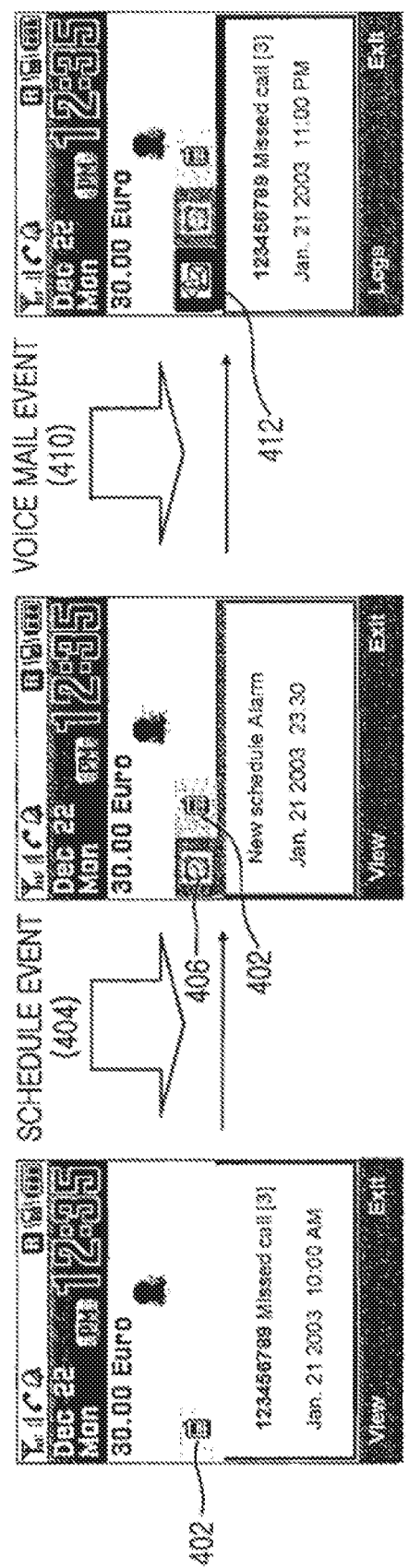

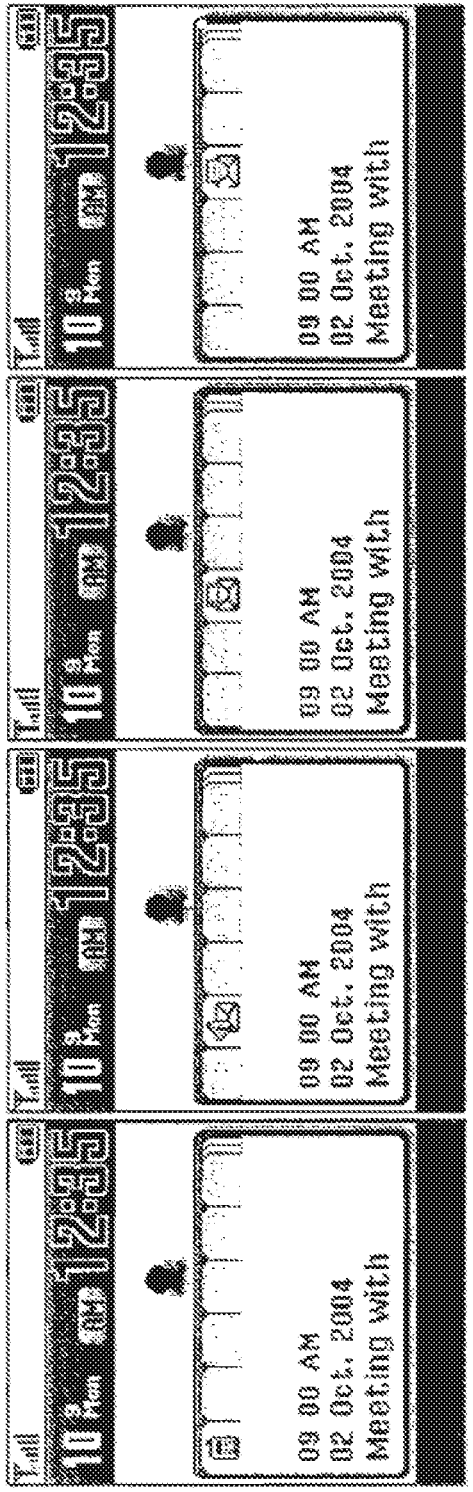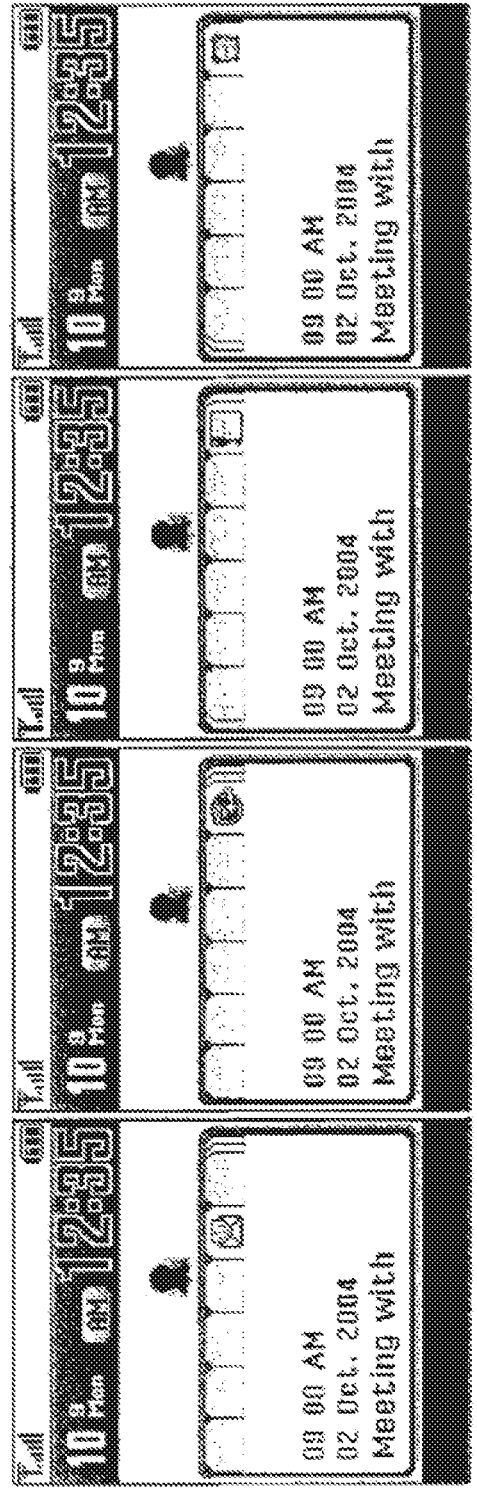

METHOD OF DISPLAYING AN EVENT IN A MOBILE TERMINAL AND MOBILE TERMINAL IMPLEMENTING THE SAME

CROSS REFERENCE TO RELATED APPLICATIONS

This application is a continuation of prior application Ser. No. 15/613,784 filed on Jun. 5, 2017, which is a continuation of prior application Ser. No. 13/943,278, filed on Jul. 16, 2013, which has been abandoned; which is a continuation of prior application Ser. No. 11/387,866, filed on Mar. 24, 2006, which has been abandoned; and which claims the benefit under 35 U.S.C. § 119(a) of Korean patent application Nos. 10-2005-0027726 and 10-2006-0020898, filed in the Korean Intellectual Property Office on Apr. 1, 2005, and Mar. 6, 2006, respectively, the entire disclosure of each of which is hereby incorporated by reference.

BACKGROUND OF THE INVENTION

Field of the Invention

The present invention relates generally to a mobile terminal. More particularly, the present invention relates to a method of, and a mobile terminal configured for more efficiently displaying indications of occurrences of various events generated in a mobile terminal in idle mode.

Description of the Related Art

In recent years, the development of mobile communication technology has enabled mobile terminals to exchange a variety of messages beyond traditional phone calls, including Short Messaging Service (SMS) messages, Multimedia Messaging Service (MMS) messages, and e-mail.

Also, mobile terminals can provide a Caller Identification (CID) service so that callers can be identified.

When a message event or a missed call occurs while the mobile terminal is in idle mode, an event indication indicating the occurrence of an event appears on a display until a user presses a predetermined key, such as an OK button.

According to the conventional event indication method, when two different message events occur successively, a conventional mobile terminal displays only an indication of occurrence of the latter event on the display, although the user has not checked the former event. For instance, when a call from 010-123-4567 is missed, the user is alerted of the missed call during idle mode of the mobile terminal, as illustrated in FIG. 1A. If an SMS message is received and the missed call still has not been checked, the mobile terminal substitutes an incoming SMS message indication for the missed call indication in the display, as illustrated in FIG. 1B.

One drawback with the conventional event indication method is that a user is not effectively notified when a plurality of incoming events occur. Since only an indication of the latest incoming event appears in the LCD window, at any given time the user does not know the number and types of incoming events that have occurred. Further, another drawback is that the user does not know the previous event until he checks the latest incoming event because only the latest incoming event is indicated.

SUMMARY OF THE INVENTION

An object of the present invention is to address at least the above problems and disadvantages and to provide at least the advantages below. Accordingly, an object of the present invention is to provide a method of, and a mobile terminal configured for, efficiently displaying indications of various events generated in a mobile terminal in idle mode.

Another object of the present invention is to provide a method of, and a mobile terminal configured for, upon occurrences of multiple events in idle mode, displaying indications of all the events on a display.

The above objects are achieved by providing a method of, and a mobile terminal configured for, efficiently displaying an event indication in the form of a pop-up box during idle mode of a mobile terminal. In the method, upon occurrence of a second event in idle mode, it is determined whether an event pop-up box indicating an occurrence of a first event of the same type as the second event exists. When the event pop-up box indicating the occurrence of the first event exists, the event pop-up box is updated with information indicating the occurrence of the second event and displayed on a display.

In the mobile terminal, if, upon occurrence of a second event in idle mode, the event pop-up box indicating occurrence of a first event of the same type as the second event, a controller updates the event pop-up box with information indicating the occurrence of the second event, and a display displays the updated event pop-up box under control of the controller.

BRIEF DESCRIPTION OF THE DRAWINGS

The above and other exemplary objects, features and advantages of the present invention will become more apparent from the following detailed description when taken in conjunction with the accompanying drawings, in which:

FIGS. 1A and 1B illustrate conventional event indications on a display in a mobile terminal;

FIG. 2 shows a block diagram of a mobile terminal according to an exemplary embodiment of the present invention;

FIGS. 4A, 4B and 4C illustrate a sequence of event pop-up box generation on a display in the mobile terminal according to an exemplary embodiment of the present invention;

FIGS. 6A to 6H illustrate a plurality of arranged pop-up boxes on the display in the mobile terminal according to an exemplary embodiment of the present invention.

Throughout the drawings, like reference numbers should be understood to refer to like elements, features, and structures.

DETAILED DESCRIPTION OF EXEMPLARY EMBODIMENTS

Figure 3:
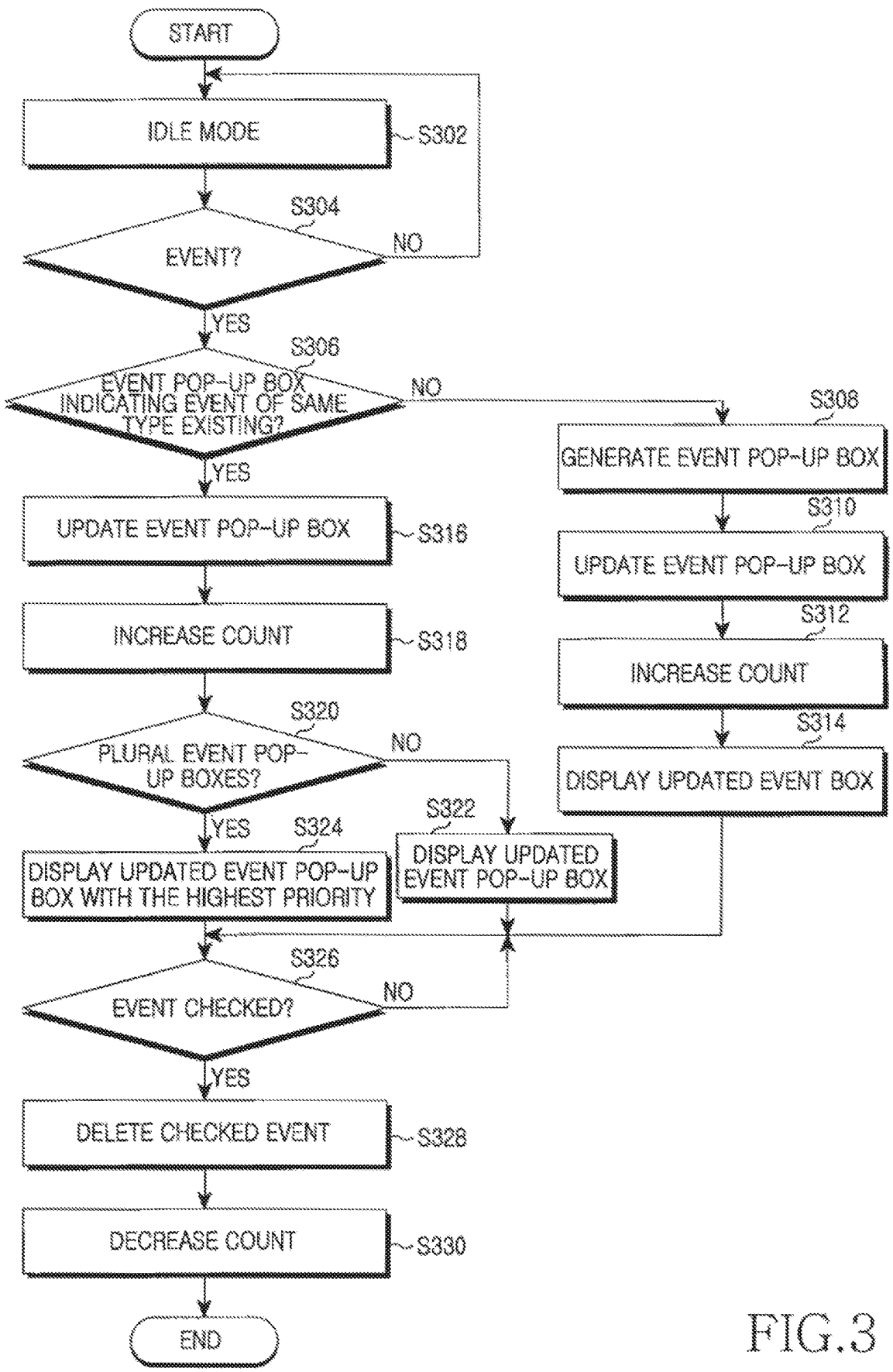
FIG. 3 shows a flowchart illustrating an operation for displaying an event indication in the mobile terminal according to an exemplary embodiment of the present invention.

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

FIG. 2 shows a block diagram of a mobile terminal according to an exemplary embodiment of the present invention.

In reference to FIG. 2, the mobile terminal includes a controller 200, a Radio Frequency (RF) module 202, a Modulator-DEModulator (MODEM) 204, an audio processor 206, a keypad 208, a memory 210, a display 212, and a video processor 214.

The RF module 202 implements the radio communication functionality of the mobile terminal. The RF module 202 comprises an RF transmitter (not shown) for upconverting and amplifying a transmission signal and an RF receiver (not shown) for low-noise-amplifying and downconverting a received signal.

The MODEM 204 is provided with a transmitter for encoding and modulating the transmission signal and a receiver for demodulating and decoding the received signal.

The audio processor 206 converts an electrical signal received from a microphone to audio data, and demodulates coded audio data received from the RF module 202 and outputs the audio data through a speaker. The audio processor 206 preferably comprises a CODer and DECoder (CODEC) for converting a digital audio signal received from the RF module 202 to an analog signal or for converting an analog audio signal generated from the microphone to a digital audio signal. The CODEC refers to a data CODEC for processing packet data and an audio CODEC for processing an audio signal such as voice. The CODEC can be incorporated in the controller 200.

The memory 210 may comprise a program memory and a data memory. The memory 210 stores information needed for controlling the operation of the mobile terminal and information selected according to user selection information.

The display 212 can be configured with a Liquid Crystal Display (LCD) for displaying visual data generated in the mobile terminal. If the LCD is implemented in a touch screen fashion, the display 122 can operate as an input portion.

The display 212 displays various events in pop-up boxes in idle mode under the control of the controller 200. Users are notified of various events by corresponding event pop-up boxes as illustrated in FIGS. 6A to 6H. Each event pop-up box provides information about the latest event including event date and time.

The video processor 214 generates visual data by which to display a video signal. The video processor 214 processes video data received from a camera module (not shown) or memory 210 on a frame basis and outputs the frame video data according to the characteristics and size of the display 212.

The video processor 214 also includes a video CODEC (not shown) for compressing the frame video data in a predetermined method or decompressing the compressed frame video data to the original frame video data. The video CODEC can be, for example, a JPEG CODEC, an MPEG4 CODEC, a Wavelet CODEC, or any other type of CODEC.

The keypad 208 has alphanumerical keys for inputting numbers and characters and function keys for invoking functions. The user can select an event pop-up box to be activated using directional keys in the keypad 208.

The controller 200 provides overall control of the operation of the mobile terminal according to an exemplary embodiment of the present invention. Upon generation of an event during idle mode, the controller 200 determines whether an event pop-up box showing information about the same type of an event as the generated event exists. If it exists, the controller 200 updates the event pop-up box with the information about the event. After the update, the controller 200 preferably increases the count indicating the total number of events in the event pop-up box by the number of events generated.

The controller 200 also directs the display 212 to display the updated event pop-up box. If a plurality of event pop-up boxes having event information exist on the display 212, the controller 200 controls the updated event pop-up box to be displayed with the highest priority.

The event can be, for example, a missed call, a voice mail event, an SMS event, an MMS message event, a schedule event, or a Digital Rights Management (DRM) event.

If the user has checked particular events in the displayed event pop-up box, the controller 200 deletes the information of the events from the event pop-up box and decreases the event count by the number of the deleted events.

If many event pop-up boxes are to be displayed on display 212, it is preferred that only a predetermined number of event pop-up boxes are displayed as indexes, while the other event pop-up boxes are displayed as tabs.

In the absence of an event pop-up box indicating the same type of event as the generated event, the controller 200 creates an event pop-up box to store the information of the event and shows information of the event in the event pop-up box.

FIG. 3 shows a flowchart illustrating an operation for displaying an event indication in the mobile terminal according to an exemplary embodiment of the present invention.

Referring to FIGS. 2 and 3, the mobile terminal is in idle mode in step S302 and the controller 200 determines whether an event has occurred during idle mode in step S304. The event can be, for example, a missed call, a voice mail event, an SMS event, an MIMS message event, a schedule event, or a DRM event.

A missed call is an incoming call that was not answered normally, a voice mail event is reception of a voice message, an SMS event is reception of text of a predetermined size, an MIMS message event is reception of a message capable of carrying a multimedia file, a schedule event is an alarm notifying the user of a registered schedule at a registered time, and a DRM event is reception of an authentication key for a copyrighted multimedia file.

Each event is processed by a corresponding task processor. The task processor is a software module for performing a corresponding function. Each task processor monitors generation of a corresponding event under the control of an Operating System (OS). Upon generation of an event, the task processor notifies the main processor of the controller 200 of the event occurrence. For example, upon generation of a missed call event, a call task processor notifies the main processor of the controller 200 of the missed call event occurrence. Each task processor and the main processor are activated in the controller 200. In the following exemplary embodiments, the controller 200 performs the operational algorithms of the task processors and the main processor.

On the occurrence of an event, that is, when a task processor reports generation of an event to the controller 200, the controller 200 determines whether an event pop-up box containing information about the same type of event as the event exists in step S306.

The event pop-up box is a display tool allocated according to event type. It is a display folder in concept. For example, when a plurality of missed call events are generated, the missed call events are indicated in a missed call event pop-up box. When a plurality of voice mail events occur, the voice mail events are indicated in a voice mail event pop-up box.

In accordance with an exemplary embodiment of the present invention, the following event pop-up boxes are representative of those that can be defined: a missed call event pop-up box for indicating missed calls, a voice mail event pop-up box for indicating reception of voice mails, an SMS event pop-up box for indicating reception of SMS messages, a multimedia message event pop-up box for indicating reception of multimedia messages, a schedule event pop-up box for alerting the user of scheduled events, and an authentication key event pop-up box for storing and displaying an authentication key.

Step S306 is performed to check whether the incoming event is of the same type as an event indicated by an existing event pop-up box displayed on the display 212. For example, if the user did not check the previous missed calls, the controller 200 displays a missed call event pop-up box 402 (FIG. 4A) on the display 212 to indicate missed calls. Upon generation of a schedule event in this state, the controller 200 determines whether a schedule event pop-up box exists on the display 212 to indicate the schedule event.

In the presence of a corresponding event pop-up box, the controller 200 updates the event pop-up box with information about the generated event in step S316.

After updating the event pop-up box, the controller 200 increases the count indicating the total number of events in the event pop-up box in step S318. The count indicates the total number of events that the user has not checked in the event pop-up box.

For instance, if the user has not checked three voice mails indicated in the voice mail pop-up box, the event count is 3. Upon generation of a new voice mail event with the three voice mail messages unchecked, the event count of the voice mail event pop-up box is increased to 4. The event information refers to the contents and the date and time of the event. A variety of additional information can also be included in the event information.

The controller 200 determines whether a plurality of event pop-up boxes indicating events exist on the display 212 in step S320.

If only the updated event pop-up box exists, the controller 200 displays it on the display 212 in step S322. Simultaneously, the controller 200 displays the information of the generated event and the event count as well on the display 212.

On the other hand, if a plurality of event pop-up boxes exist, the controller 200 displays the updated event pop-up box on the display 212 with the highest priority in step S324.

Here, the controller 200 displays the updated event pop-up box with the highest priority over the other event pop-up boxes.

For example, when a new schedule event 404 occurs with a pop-up box 402 indicating a missed call event displayed at index 1 on the display 212 (FIG. 4A), a schedule event pop-up box 406 is activated with priority to show information about the schedule event 404, as illustrated in FIG. 4B.

Similarly, when a new voice mail event 410 is generated in the state shown in FIG. 4B, a voice mail event pop-up box 412 is activated first on the display 212 during idle mode, as illustrated in FIG. 4C.

If many event pop-up boxes are to be displayed on the display 212, only a predetermined number of event pop-up boxes are displayed as indexes, as illustrated in FIGS. 6A to 6E, while the other event pop-up boxes are displayed as tabs.

If a user wants to activate a particular event pop-up box, he selects it using the keypad 208.

For example, when the user selects a right directional key on the display 212 illustrated in FIG. 6A, the controller 200 activates the second event pop-up box as illustrated in FIG. 6B. When the user selects the right directional key again on the display 212, illustrated in FIG. 6B, the controller 200 activates the third event pop-up box, as illustrated in FIG. 6C.

When the user selects a left directional key on the display 212 illustrated in FIG. 6B, the controller 200 activates the previous event pop-up box, illustrated in FIG. 6A.

On the other hand, in the absence of the corresponding existing event pop-up box in step S306, an event pop-up box to indicate the event is generated in step S308. If the generated event is triggered by key input from the user, the controller 200 neglects this event.

In step S310, the controller 200 updates the event pop-up box with information about the event and sets the count to an initial value. Since the event is the first to be indicated in the event pop-up box, the count is set to 1. Additional events cause the controller 200 to increase the event count, step S312. It is preferred that the count is set to the number of generated events.

In step S314, the controller 200 displays the updated event pop-up box.

The controller 200 determines whether the user has checked the indicated event in step S326. If the user has not checked the event, the controller 200 displays all created event pop-up boxes to allow the user to view the events in an organized manner as illustrated in FIG. 4C, even though the mobile terminal is turned on again or the display 212 is activated again.

If the user has checked the event, the controller 200 deletes the checked event information from the event pop-up box in step S328. It can be noted that event deletion means deletion of the event indication from the event pop-up box, not complete deletion of the event information. The actual event information is stored in a predetermined area of the memory 210, and can be deleted completely from a corresponding event folder within the memory 210 using a separately configured menu.

Figures 5A, 5B:
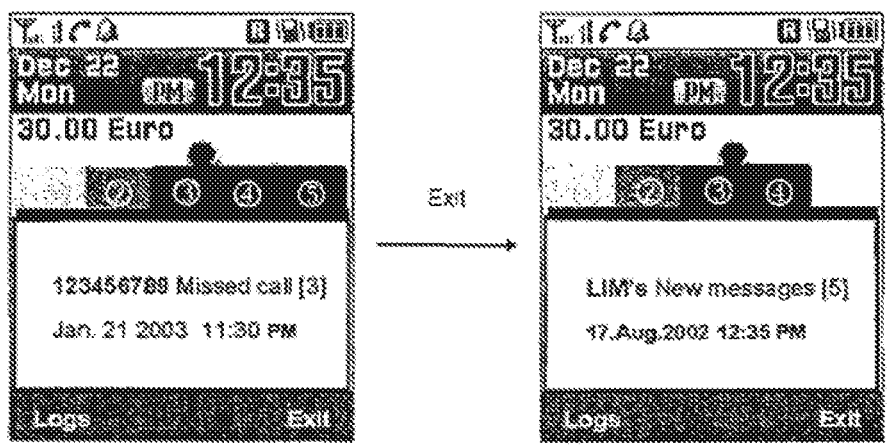
FIGS. 5A and 5B illustrate a sequence of event pop-up box deletion on the display in the mobile terminal according to an exemplary embodiment of the present invention.

The event pop-up box displayed during idle mode can be deleted from the display 212. When a predetermined command such as, for example, "EXIT" is selected with the event pop-up box activated as illustrated in FIG. 5A, the current event pop-up box disappears as illustrated in FIG. 5B.

After deleting the checked event information, the controller 200 decreases the count by the number of deleted event indications and displays the decreased count on the display 212 in step S330.

In accordance with various exemplary embodiments of the present invention as described above, since events are indicated in the form of pop-up boxes during idle mode of a mobile terminal, and a user can easily view the event indications. Also, the event pop-up box generation and deletion algorithm according to one exemplary embodiment of the present invention leads to efficient event pop-up box management.

While the invention has been shown and described with reference to certain exemplary embodiments thereof, it will be understood by those of ordinary skill in the art that various changes in form and detail may be made therein without departing from the spirit and scope of the present invention as defined by the appended claims.

What is claimed is:

1. A portable communication device comprising:
communication circuitry;
a display; and
a controller configured to:
  detect a first event corresponding to a first incoming communication received via the communication circuitry,
  control to display on the display a first pop-up box to notify of an occurrence of the first event, the first pop-up box including first time information indicative of a first time of the occurrence of the first event, the first pop-up box including a first icon indicative of a first type corresponding to the first event, and the first pop-up box including a first description corresponding to the first event,
  detect a second event corresponding to a second incoming communication received via the communication circuitry after the first event is detected,
  if a second type of the second event is different from the first type, control to display on the display a second pop-up box to notify of an occurrence of the second event such that the second pop-up box is displayed above the first pop-up box, the second pop-up box including second time information indicative of a second time of the occurrence of the second event, the second pop-up box including a second icon indicative of a second type corresponding to the second event, and the second pop-up box including a second description corresponding to the second event, and
  if the second type of the second event is same as the first type, update the first pop-up box displayed on the display, without displaying the second pop-up box, to notify of the occurrence of the second event, the updated first pop-up box including the second time information.

2. The portable communication device of claim 1, wherein the controller is further configured to:
  before the first pop-up box or the second pop-up box is displayed, control to display on the display an idle screen including a third icon indicative of a non-auditory notification corresponding to the first incoming communication or the second incoming communication, and
  control to display on the display a corresponding one of the first pop-up box or the second pop-up box on the idle screen.

3. The portable communication device of claim 1, further comprising:
  memory configured to store a message application and a call application,
  wherein the controller is further configured to:
    as at least part of the detecting of the first event, identify the first event as related to the message application, and
    as at least part of the detecting of the second event, identify the second event as related to the call application.

4. The portable communication device of claim 3, wherein the communication circuitry includes first communication circuitry and second communication circuitry, and
  wherein the controller is further configured to:
    as at least part of the identifying of the first event, identify that the first event is received via the first communication circuitry, and
    as at least part of the identifying of the second event, identify that the second event is received via the second communication circuitry.

5. The portable communication device of claim 4, wherein the first communication circuitry includes packet-based communication circuitry, and the second communication circuitry includes cellular-based communication circuitry.

6. A portable communication device comprising:
communication circuitry;
a display; and
a controller configured to:
  process a first event corresponding to a first incoming communication received via the communication circuitry,
  control the display to display, in a first pop-up box, first notification information to notify of an occurrence of the first event, the first notification information including first time information associated with the first event, and the first notification information including a first icon indicative of a first type corresponding to the first event,
  process a second event corresponding to a second incoming communication received via the communication circuitry, the second incoming communication received after the first incoming communication,
  if the second event is associated with a type different from the first type, control the display to display, in a second pop-up box, second notification information to notify of an occurrence of the second event such that the second pop-up box is displayed above the first pop-up box, the second notification information including second time information associated with the second event, and the second notification information including a second icon indicative of a second type corresponding to the second event, and
  if the second event is associated with the first type, control the display to display, in the first pop-up box, second notification information to notify of the occurrence of the second event, the second notification information including the second time information associated with the second event, and the second notification information including the first icon indicative of the first type.

7. The portable communication device of claim 6, wherein the first notification information to notify of the occurrence of the first event further comprises at least one of content of the first event or counterpart information associated with the first event.

8. The portable communication device of claim 6, wherein the first notification information to notify of the occurrence of the first event further comprises a counter indicating information related to a number of times a same type event has occurred.

9. The portable communication device of claim 6, wherein the controller is further configured to:
  determine whether the first event is checked by a user, and
  if it is determined that the first event is checked by the user, delete the first notification information to notify of the occurrence of the first event from the first pop-up box, wherein the first notification information to notify of the occurrence of the first event stored in a memory of the portable communication device is retained without deletion.

10. The portable communication device of claim 6, wherein the first pop-up box in which the second notification information to notify of the occurrence of the second event is displayed is at a position designating the first event as being a most recent incoming communication event.

11. The portable communication device of claim 6, wherein the first pop-up box in which the second notification information to notify of the occurrence of the second event is displayed includes a counter to indicate information related to a number of times an event has occurred.

12. The portable communication device of claim 6, wherein the controller is further configured to:
 determine whether the first notification information to notify of the occurrence of the first event is checked by a user, and
 if it is determined that the first notification information to notify of the occurrence of the first event is checked by the user, decrease a counter by a number of events checked by the user.

* * * * *